May 18, 1965 P. J. JENKINS 3,183,956
PNEUMATIC TIRE
Filed Sept. 10, 1963 4 Sheets-Sheet 2

United States Patent Office 3,183,956
Patented May 18, 1965

3,183,956
PNEUMATIC TIRE
Peter John Jenkins, Four Oaks, Sutton Coldfield, England, assignor to Dunlop Rubber Company Limited, London County, England, a British company
Filed Sept. 10, 1963, Ser. No. 307,819
Claims priority, application Great Britain, Sept. 24, 1962, 36,175/62
17 Claims. (Cl. 152—191)

This invention relates to pneumatic tires.

According to the invention a pneumatic tire comprises a pair of annular sidewall portions each comprising an annulus of reinforced rubber compound, and a detachable circumferential tread hoop extending around and mounted at its sides on the sidewall portions, said circumferential tread hoop incorporating a plurality of axially extending segments arranged end-to-end circumferentially of the tire in interlocking relationship, some at least of the segments being flexible.

Preferably, each of the segments is detachable from the hoop, and it is preferred that some at least of the segments are detachable when the hoop is mounted upon the sidewalls.

Preferably also, the hoop comprises alternate flexible and rigid segments.

Preferably also, each sidewall is provided in its radially outermost regions with a bead wire, and the circumferential tread hoop is mounted on the sidewalls by the reception of these radially outermost regions within bead seating means provided on some at least of the segments.

According to the invention also, a method of manufacturing a pneumatic tire comprising a pair of detachable annular sidewall portions comprises building the sidewall portions by forming a layer or layers of tire building fabric into a substantially-cylindrical condition, positioning a pair of bead wires, one over each end of the layer or layers, turning the ends of the layer or layers around the bead wires, moving the bead wires towards one another while expanding the layer or layers radially-outwardly to form the layer or layers into a toroidal shape, and forming the layer or layers into two annular sidewall portions by cutting the layer or layers around the mid-circumferential plane thereof.

Preferably, a second pair of bead wires is positioned coaxially with the first mentioned pair of bead wires and adjacent to the radially outer portions of the layer or layers of tire building fabric, and the cut ends are wrapped one around each bead wire of the second pair.

One embodiment of the invention will now be described, by way of example with reference to the accompanying drawings in which.

A pneumatic earthmover tire comprises a pair of sidewall portions 1 and a circumferential tread hoop 2 which is detachable from the sidewall portions.

Figure 3:
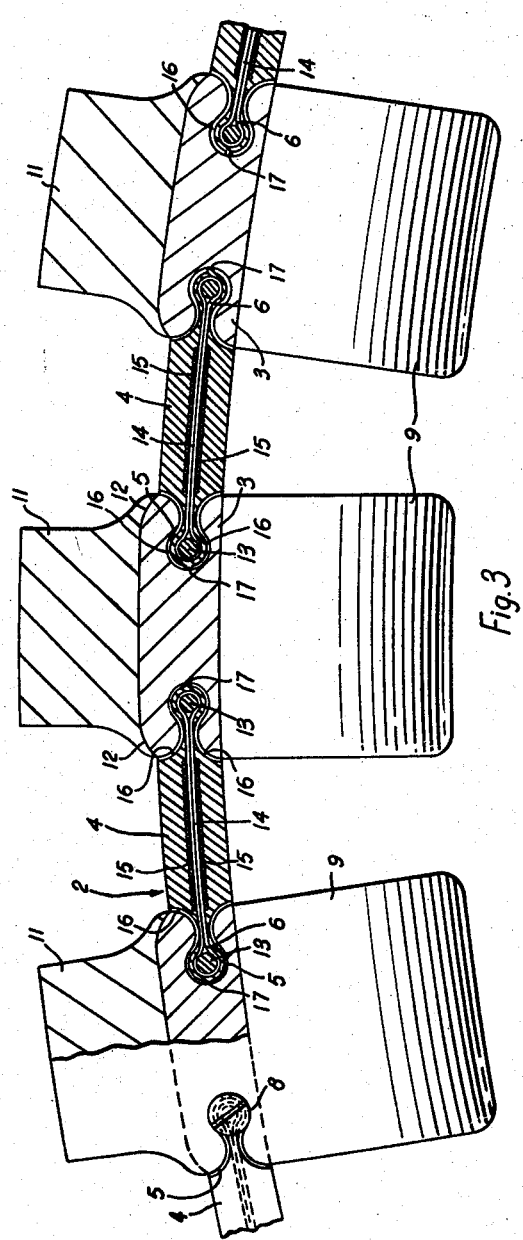
FIGURE 3 is a view of the tread hoop, partly in circumferential cross-section and partly in side elevation.

As shown in FIGURE 3, the hoop is fabricated from a plurality of transversely-extending interlocking rigid metal segments 3 and flexible resilient segments 4 arranged alternately end-to-end circumferentially of the hoop. Means for interlocking the segments together comprises a transversely-extending groove 5 and a complementarily shaped projection 6 provided, respectively, on each circumferential end of each metal segment and of each flexible segment, the projection 6 having an enlarged portion spaced from and joined to the end of the segment by a relatively narrower portion. The segments are detachably assembled together by the relative movement of the segments in a transverse direction of the hoop to slide the projections within the grooves.

Figure 2:
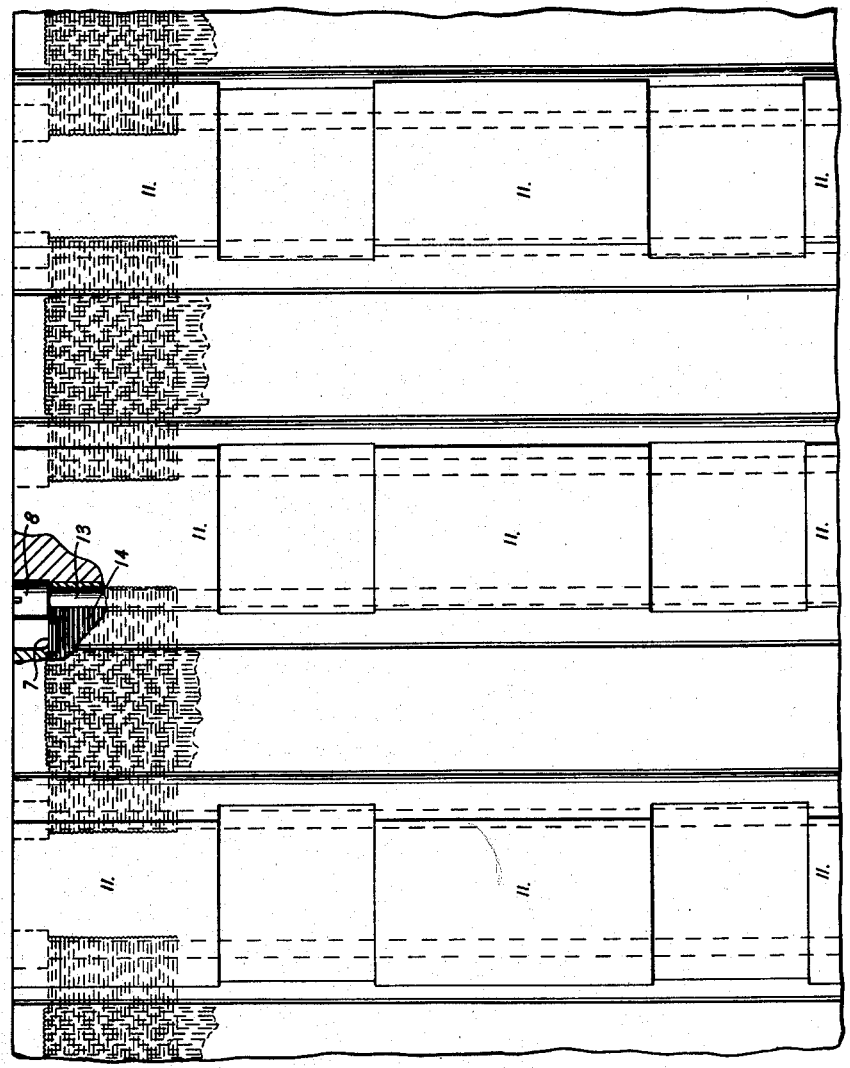
FIGURE 2 is a view, partly in the direction of arrow II in FIGURE 1 and partly in section, of a part of a tread hoop of the tire.

When the segments are correctly assembled together, the projections 6 of the flexible segments terminate short of the ends of the grooves in the metal segments as shown at 7 in FIGURE 2, and securing means in the form of screws 8 (one of which is shown in each of FIGURES 2 and 3) received in screw-threaded engagement with complementary screw-threaded portions in the ends of the grooves, secure the projections within the grooves.

Each metal segment, which is cast from steel but may be cast from spheroidal graphite cast iron, is provided with seating means for seating the radially outermost regions of the sidewall portions, the seating means comprising a radially-inwardly-extending knurled bead-seating flange 9 integrally formed at each lateral edge of the segment, each flange being of similar shape in cross-section to that of the bead seating flange provided on a conventional wheel rim. A road gripping element in the form of a rubber strip 10 comprising three axially spaced-apart rubber tread blocks 11 (FIGURE 1) is bonded to the outer peripheral surface of each metal segment, said surface being flat except at opposite longitudinal edges 12 (FIGURE 3) which are curved inwardly, with respect to their disposition on the assembled tire, to assist in bonding the gripping element to the segment.

Each flexible segment 4 is formed from vulcanized rubber and provided within each projection with a longitudinally-extending metal bead wire 13 (see particularly FIGURE 3). A steel cord reinforcement is embedded within each segment. Each reinforcement, as shown in FIGURES 2 and 3, comprises a first single length 14 of steel cord which extends at substantially 0° to the mid-circumferential plane of the hoop between the beads of its associated segment, the length of cord being wound around the beads with the windings extending from one end of the segment to the other, and adjacent windings lying side-by-side in parallel relationship. A second single length 15 of steel cord is wound in similar manner around the windings of the first length to form two further layers of cords and also to form a binding, the windings of the second length extending at 90° to the said plane. The second length of cord serves as a protection to the first layer of cord in the event of wear in, or cutting of the rubber of the segment; it also adds strength to the reinforcement, particularly when uneven stress is applied to the segment and resists tearing of the segment in a circumferential direction.

The projections 6 of each resilient segment are each provided with a metal protecting cover in the form of two shaped metal plates 16 which are bonded one on each side of the projection to protect the narrow portion of the projection from chafing on the metal segment with which it is engaged, and to allow for ease of assembly into the metal segments. A gap 17 is provided between the opposing edges of the plates to allow for compression of the projection which assists the sliding of the segments together during assembly.

Figure 1:
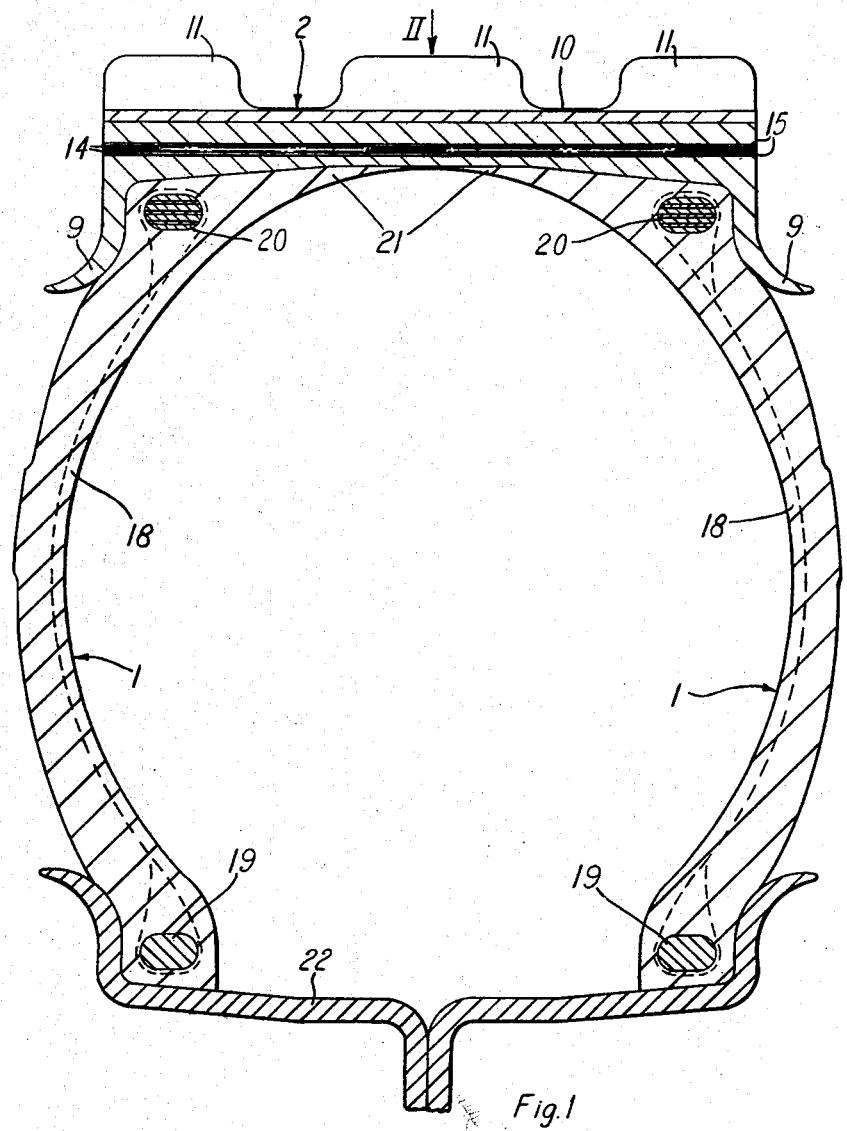
FIGURE 1 is an axial cross-sectional view of a tire forming one embodiment of the invention fitted to a wheel rim.

As shown in FIGURE 1 each sidewall portion of the tire comprises an annular steel-cord reinforced rubber compound portion 18 which extends between and around a radially inner bead wire 19 and a radially outer bead wire 20, one coaxial with the other, the cords extending at 90° to the mid-circumferential plane of the tire. Each sidewall portion, therefore, comprises a radially inner bead region (which is of conventional construction) and a radially outer bead region which is seated within one of the bead seats provided by the flanges 9 of the metal segments. The outer bead region of each sidewall portion is provided with a toe 21 which extends axially into engagement with the toe of the outer bead region of the other sidewall, the toes extending across and covering the inner peripheral surface of the circumferential hoop and providing protection against the chafing of an inner tube on the segments of the hoop. Each outer bead region is also provided on its external surface with a polyurethane chafer strip (not shown) to lessen the amount of wear of this region which may take place due to the relative movement between the bead and the seating flanges of the metal segments as the tire is distorted when passing through a ground-contacting position.

As shown in FIGURE 1, in radial cross-section, the axial width of each outer wire 20 is greater than its radial depth. The outer bead wire is formed from a plurality of spiral convolutions of tempered steel strip, the convolutions extending radially-outwardly of the bead from one convolution to another and being separated from one another by a layer of rubber bonded to the steel. The object of this construction is to provide the bead wire with radial flexibility to allow distortion of the ground contacting region of the tire during running but to provide rigidity of the bead wire in the axial plane to prevent the sidewall from bulging axially-outwardly between adjacent bead seating flanges of the metal segments.

The tire is made in the following manner:

The sidewall portions are built by wrapping a layer of rubberised parallel steel cord material around a collapsible cylindrical former to form the material into a cylindrical condition with the cords extending at 90° to the mid-circumferential plane of the former. The two inner bead wires 19 are positioned coaxially one at each end of the former and over the ends of the fabric which are then turned over the bead wires. The cylindrical layer of material is then removed from the collapsible former and positioned upon an inflatable former which is inflated to expand the layer of material radially-outwardly during the simultaneous movement of the bead wires symmetrically towards one another to form the layer of material into a toroidal shape. The two outer bead wires 20, carried within bead carriers, are positioned coaxially with the inner bead wires, one on each side of the shaped former carrying the sidewalls, and are brought into engagement with the radially outer regions of the shaped layer of material. The layer of material is cut around its mid-circumferential plane to form two annular sidewall layers, the cut ends of the layers then being turned one around each of the outer bead wires. The two assemblies are then removed from the former, and side-wall rubber layers and pre-cured polyurethane chafer strips are added to the assemblies which are then moulded and vulcanized to form the sidewall portions 18 of the tire.

To assemble the components of the tire, one of the sidewall portions is mounted upon a wheel rim 22 followed by the mounting of a flap (not shown), an inner tube (also not shown) and the other sidewall portion. The inner tube is then inflated sufficiently to ensure that there is no creasing of the tube in its fully inflated condition.

The hoop 2 is assembled into open-ended belt form from the rubber and metal segments which are held together by the screws 8 received within the metal segments as described above, one of the rubber segments, however, remaining unattached to the hoop. The hoop is wrapped around the sidewall portions with the outer bead regions of the sidewall portions located within the bead seats provided upon the metal segments. When the hoop is correctly positioned upon the sidewalls, the outer bead regions of the sidewall portions are pressed towards each other to reduce their diameters and allow the ends of the open belt to be brought closer together. The unattached rubber segment is then disposed with its projections located one in each of the grooves of the metal segments forming the ends of the open belt, and is moved transversely of the tire into its correct axial position in locking relationship with the metal segments to be secured in position to complete the hoop and the assembly of the tire.

The inner tube is then inflated up to a predetermined working pressure which locates and holds the four beads of the sidewall upon their bead seats as shown in FIGURE 1.

Figure 4:
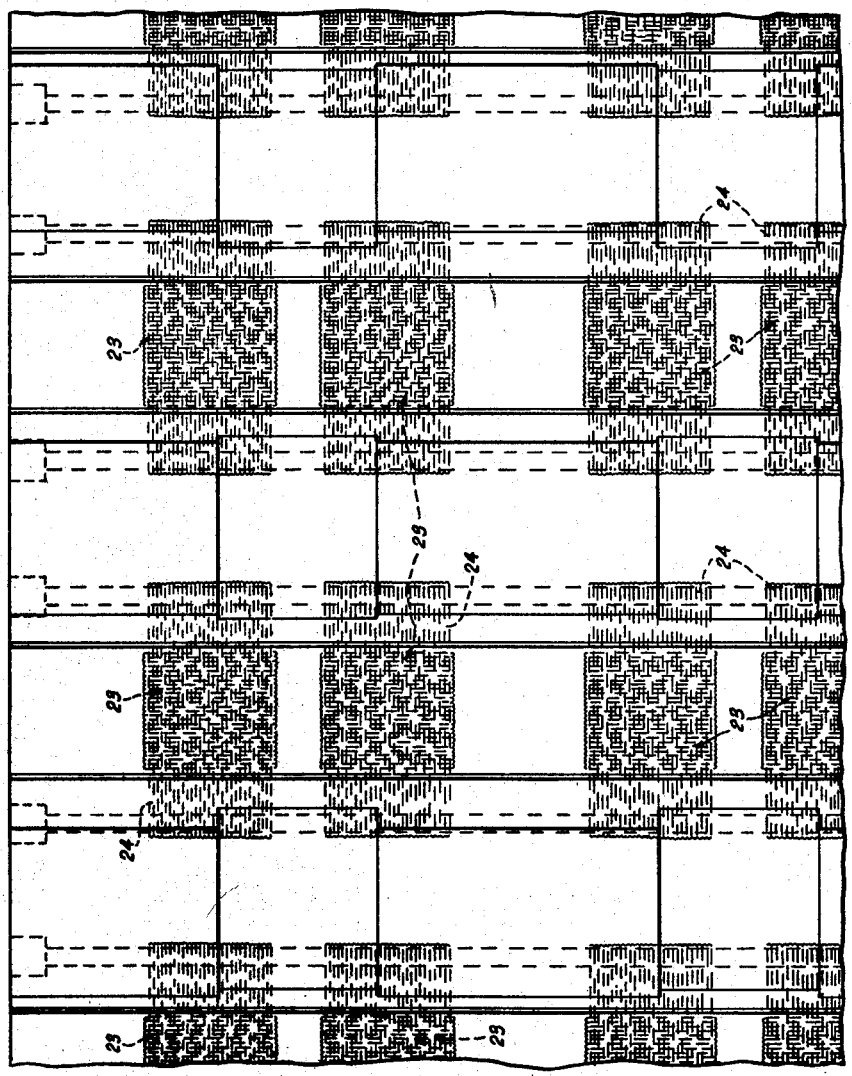
FIGURE 4 is a plan view of part of a tread hoop of a tire forming a second embodiment of the invention.

In a second embodiment of the invention, a pneumatic tire is of similar construction to that described in the first embodiment, but instead of having one steel cord reinforcement in each flexible resilient segment, as in the first embodiment, each flexible segment comprises a plurality of separate steel cord reinforcements 23 which are spaced-apart axially of the hoop. This construction is shown in FIGURE 4. Each reinforcement is of similar construction to the reinforcement described in the first embodiment, in that it comprises a single length 24 of steel cord wound around the beads 25 of the segment at 0° to the mid-circumferential plane of the hoop and a second single length 26 of cord which is wound around the windings of the first length at 90° to said plane.

In an alternative method of manufacturing the sidewall portions of the tires described in the embodiments above, a plurality of steel cord reinforced ply panels, constructed by the method described in the complete specification of co-pending British patent application No. 8,390/61 and in co-pending application of Wright et al., Ser. No. 178,083, filed March 7, 1962, now abandoned, are cut transversely midway between their ends to produce a plurality of half panels, the cords and sides of each half panel diverging from one end of the panel to the other, and the distances between the cords being equal at any transverse cross-section of the half panel.

Each sidewall portion is then made by coaxially mounting a radially inner and a radially outer bead wire upon bead wire carriers, wrapping the narrower ends and the wider ends of a number of the half panels, respectively, around the inner and the outer bead wires, the half panels lying side-by-side in abutting relationship and forming with the bead wires, an annular assembly. This assembly is provided with sidewall rubber layers and is moulded and vulcanized to produce the sidewall portion.

In a modification of either of the tires described in the above embodiments, the or each reinforcement provided in each flexible segment of the tread hoop is formed from a layer of rubberised parallel steel cord fabric which extends between the bead wires, with the cords disposed at substantially 0° to the mid-circumferential plane of the hoop, the ends of the layer being turned around the bead wires. This layer of fabric is sandwiched between two layers of parallel cord fabric, the cords of which lie at substantially 90° to said plane. In an alternative arrangement, one layer of parallel cord fabric in which the cords lie at substantially 90° is incorporated in each reinforcement, this layer of fabric lying either above or beneath the 0° cord fabric layer.

In further modifications, either of the steel cord windings of each reinforcement of the flexible segments is replaced by a layer or layers of parallel steel cord fabric the cords of which extend at substantially the same angle as that of the wound length of cord which it replaces.

In a further modification of the tires described in the above embodiments, each flexible segment of the tread hoop is provided with road gripping elements.

In a yet further modification, the radially outer bead wire of each sidewall portion is replaced with a bead wire of similar dimensions which is wound from cabled steel cord or with a bead wire of the construction described in the specification of our co-pending British patent application No. 27,523/62.

In yet further modifications, the screws 8, for securing the segments of the tread hoop together, are replaced by tapered or split pins received in holes provided in the ends of the rigid segments and extending transversely across the grooves of the segments or, the steel cord reinforcement provided in each sidewall is replaced by a textile reinforcement.

In each of the constructions described above, any of the components of the tire may be changed independently of the others to replace worn parts, and removal of and replacement of the whole of or part of the circumferential hoop may be effected without removal of the tire from the rim to which it is fitted. Furthermore, the space required to store a tire according to this invention in its collapsed state is small compared with that required for a conventional tire of similar size. Consequently, to maintain a specified number of tires according to the invention in serviceable order, the replacement parts required for this purpose occupy a small space compared with that required for the storage of replacement tires to maintain the same number of conventional tires in working order by retreading or repair.

In addition, although the circumferential tread hoop of a tire, according to the invention, is fabricated from a plurality of segments, because of the interlocking nature of the segments, the circumferential tread hoop will withstand tensile as well as compressive stresses in a circumferential direction.

Having now described my invention, what I claim is:

1. A pneumatic tire comprising a pair of annular sidewall portions each comprising an annulus of reinforced rubber compound, and a detachable circumferential tread hoop extending around and mounted at its sides on the sidewall portions, said circumferential tread hoop incorporating a plurality of axially extending segments arranged end-to-end circumferentially of the tire in interlocking relationship, some at least of the segments being flexible and securing means associated with the segments by which adjacent segments are detachably secured together in interlocking relationship to prevent relative movement of adjacent segments in the circumferential direction of the tire.

2. A pneumatic tire according to claim 1 wherein some at least of the segments are detachably mounted to form the hoop and are removable therefrom when the hoop is mounted upon the sidewalls.

3. A pneumatic tire according to claim 1 wherein the hoop comprises alternate flexible and rigid segments.

4. A pneumatic tire according to claim 1 wherein said securing means comprises a transversely extending projection provided at each circumferential end of each flexible segment, said transversely-extending projection having an enlarged portion and a relatively narrower portion, the enlarged portion being spaced from and joined to the end of the segment by the relatively narrower portion, and each rigid segment is formed with a groove of complementary shape to said enlarged portion of the projection, the segments being relatively transversely movable to engage the projections within, or disengage the projections from, the grooves, respectively, to assemble or disassemble the segments, and means are provided for preventing relative axial movement of the segments.

5. A pneumatic tire according to claim 4 wherein said projections are shorter in length than said grooves so that, in the assembled condition, the projections terminate short of the ends of the grooves, and the means for preventing relative axial movement of the segments comprises screw-threaded means received in screw-threaded engagement in the ends of the grooves.

6. A pneumatic tire according to claim 4 wherein each projection of the flexible segments is provided with a metal protecting cover to prevent chafing of the flexible segment on the rigid segment with which it is engaged.

7. A pneumatic tire according to claim 4 wherein each flexible segment is formed from rubber provided with at least one steel cord reinforcement.

8. A pneumatic tire according to claim 7 wherein each flexible segment is provided with two bead wires located one within the enlarged portion of each projection and extending transversely of the segment and axially of the hoop, and the steel cord reinforcement comprises at least one length of steel cord which is wound around the beads in a plurality of windings, each winding extending from bead to bead with adjacent windings lying side-by-side in parallel relationship and extending at substantially 0° to the mid-circumferential plane of the hoop.

9. A pneumatic tire according to claim 8 wherein the steel cord reinforcement is provided with two layers of cords extending substantially at 90° to said plane, said layers being formed from at least one length of steel cord which is wound around the windings of cord extending at substantially 0° to said plane.

10. A pneumatic tire according to claim 8 wherein the steel cord reinforcement is provided with at least one layer of cords lying at substantially 90° to said plane and formed from a layer of rubberised parallel steel cord fabric.

11. A pneumatic tire according to claim 7 wherein each flexible segment is provided with two bead wires, located one within the enlarged portion of each projection and extending transversely of the segment and axially of the hoop, and the steel cord reinforcement comprises a layer of rubberized parallel steel cord fabric extending between the bead wires with the cords disposed at substantially 0° to the mid-circumferential plane of the hoop, the ends of the layer extending around the bead wires.

12. A pneumatic tire according to claim 11 wherein the steel cord reinforcement is provided with two layers of cords extending substantially at 90° to said plane, said layers being formed from at least one length of steel cord which is wound around the layer of cords extending at substantially 0° to said plane.

13. A pneumatic tire according to claim 11 wherein the steel cord reinforcement is provided with at least one layer of cords lying at substantially 90° to said plane and formed from a layer of rubberised parallel steel cord fabric.

14. A pneumatic tire according to claim 1 wherein each sidewall portion is provided at its radially outer portion with a bead region comprising a bead wire, and the tread hoop is provided with bead seating means for said bead region.

15. A pneumatic tire according to claim 14 wherein said bead seating means for each sidewall portion comprises a radially inwardly extending bead seating flange provided at a lateral edge of each rigid segment.

16. A pneumatic tire according to claim 14 wherein each sidewall portion is reinforced with at least one layer of tire building fabric, said layer extending around said bead wire in the radially outer portion.

17. A pneumatic tire according to claim 1 wherein each sidewall portion is provided at its radially outermost portion with an axially inwardly extending toe, the toes of the sidewall portions extending across and covering the inner peripheral surface of the tread hoop.

References Cited by the Examiner

UNITED STATES PATENTS

| | | | |
|---|---|---|---|
| 820,104 | 5/06 | Fawcett et al. | 152—191 |
| 1,155,413 | 10/15 | Gannett | 152—219 |
| 1,346,503 | 7/20 | Master | 152—191 |
| 1,608,990 | 11/26 | Mott | 152—191 |
| 1,661,978 | 3/28 | Talbott | 152—344 X |
| 2,157,004 | 5/39 | Nelson. | |
| 2,742,943 | 4/56 | Jenkins et al. | 152—344 |
| 2,990,002 | 6/61 | Cassady et al. | 156—132 |
| 3,030,252 | 4/62 | Edgerly et al. | 156—132 |

ARTHUR L. LA POINT, *Primary Examiner.*